March 22, 1966 A. J. JENSEN 3,242,007

PYROLYTIC DEPOSITION OF PROTECTIVE COATINGS OF SEMICONDUCTOR SURFACES

Filed Nov. 15, 1961 2 Sheets-Sheet 1

INVENTOR

Arthur J. Jensen

BY

Stevens, Davis, Miller & Mosher

ATTORNEYS

INVENTOR
Arthur J. Jensen

BY
Stevens, Davis, Miller & Mosher
ATTORNEYS

United States Patent Office 3,242,007

Patented Mar. 22, 1966

3,242,007

PYROLYTIC DEPOSITION OF PROTECTIVE COATINGS OF SEMICONDUCTOR SURFACES

Arthur J. Jensen, Richardson, Tex., assignor to Texas Instruments Incorporated, Dallas, Tex., a corporation of Delaware Filed Nov. 15, 1961, Ser. No. 152,514

21 Claims. (Cl. 117—201)

This invention relates to a method for protecting the surfaces of semiconductors, and more specifically to a method for protecting such surfaces by the pyrolytic deposition of protective coatings thereon from organo-silicon compounds.

The surface cleanliness of semiconductor devices has a very important effect on their electrical characteristics. According to the prior art, several materials are used to preserve the surface of a semiconductor in a clean condition after cleanliness has been attained. There is, for example, the use of organic materials such as silastic and/or varnish compounds as surface coatings, and there are also glass and the oxide of the semiconductor used for the same purpose. The difficulty, however, is that organic materials are not impervious to water and, in fact, tend to trap contaminates on the surface of the semiconductor, while the glass and oxide coatings, being formed at high temperatures, consume some of the semiconductor material (in the case of the glass because it cannot be avoided, in the case of the oxide because it is necessary in producing the oxide) and usually result in a semiconductor having poor or unstable electrical characteristics.

In accordance with the present invention the surfaces of semiconductor devices, after cleaning, are protected by the pyrolytic deposition of a protective coating from organo-silicon compounds. In one aspect, the invention relates to preparing the semiconductor surface by a cleaning technique which provides high breakdown voltage devices. The compounds of the present invention are members of the classes of alkylsilicates, arylsilicates and alkylalkoxysilanes. The organic silicon compound is passed through a reactor wherein, by pyrolytic deposition techniques, a surface coating is deposited over the entire surface of an etched semiconductor slice. Parts of the slice are then lapped, the slice is nickel-plated, cavitroned and packaged to produce semiconductor devices.

By the use of the method of this invention a much thicker protective coating can be deposited over shorter periods of time in comparison with thermally grown oxide coating on silicon, for example. Furthermore, there is no removal of material from the semiconductor to form the protective coating as there is with a thermal oxidation process. Since the deposition takes place at a fairly low temperature (generally about 800° C.) the process has little effect on doping levels and other physical properties of the device. The protective coating adheres well to the surface of the device, is moisture resistant and is not easily affected by chemical actions.

The invention will be better understood with reference to the following detailed description taken in conjunction with the appended claims and the accompanying drawings wherein:

Figure 1:
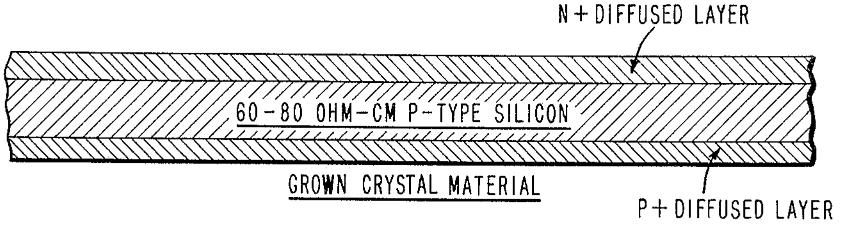
FIGURE 1 is a slice of P-type grown crystal.

Referring to FIGURE 1, initially, a slice of approximately 8 mils thickness, by way of example, is cut from a P-type grown silicon crystal. The electrical resistivity of the crystal is from 60 to 80 ohm-cm. By standard diffusion processes, an N+ layer is diffused into the P-type slice on one side, the diffusion depth being about 2 mils. A phosphorous diffusion source can be used to make this diffusion. A P+ layer is diffused into the other side of the slice, the thickness being about 1.5 mils. A boron diffusion source can be used to make this diffusion. The diffused silicon slice is shown in FIGURE 1.

Figure 2:
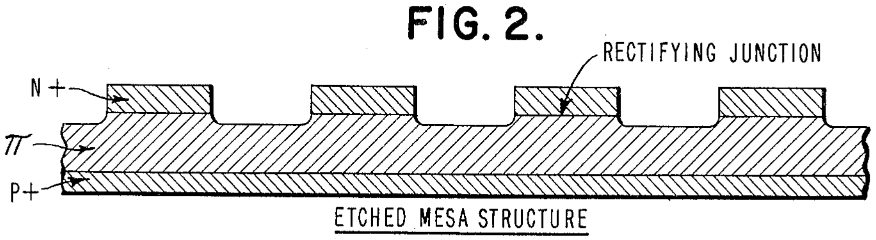
FIGURE 2 is an etched mesa structure.

Referring to FIGURE 2, after the N+ and P+ diffusion layers are formed in the P-type silicon slice, mesas are cut thereon in any suitable manner well known to the art. The mesas in accordance with the example above given, are cut to a depth of 4 mils from the top surface of the slice, there being approximately 50 distinct mesas (not shown) etched on the surface of the slice with the dimensions as shown in FIGURE 2. The slice itself has a semicircular surface, the radius of the circle being about one inch.

After the mesas are etched, the slice is soaked in hydrofluoric acid to remove any contamination and stop further surface activity due to the boron and phosphorous diffusions. However, the top portion of the mesas should be lightly lapped to remove the phosphorous glaze.

After the hydrofluoric acid soak and lapping, the slice is cleaned as follows—

Step 1: The silicon slice is boiled in deionized water for about ten minutes.

Step 2: The slice is then heated in concentrated nitric acid at 100° C. for about ten minutes.

Step 3: The slice is again boiled in deionized water for about ten minutes.

Step 4: The slice is then heated in concentrated sulfuric acid at 200° C. for about ten minutes.

Step 5: The slice is boiled again in deionized water for about ten minutes and subsequently washed in deionized water at room temperature for about 20 minutes.

Step 6: Finally, the slice is dried by storage in a low moisture content dry air box for approximately two hours.

The foregoing six steps are important for best results with the present invention although not absolutely necessary thereto.

In order to determine which acid would be best to use in steps 2 and 4 supra, surface treatments were made by soaking the slice in hydrofluoric acid, hot nitric acid, hot sulfuric acid and all possible combinations of these acids. The table below shows the median values of breakdown voltages for the various surface treatments. The results, as indicated in the table, show that the use of nitric acid, followed by the use of sulfuric acid after boiling the slice in deionized water for 10 minutes produced the best results.

*Table.—Median breakdown voltages for various surface treatments*

| First Treatment | Second Treatment | | | |
|---|---|---|---|---|
| | None | HF Soak | Hot $HNO_3$ | Hot $H_2SO_4$ |
| No Treatment ---v-- | 600 | 550 | 700 | 400 |
| HF Soak ---v-- | 550 | ------- | 700 | 600 |
| Hot $HNO_3$ ---v-- | 700 | 620 | ------- | 950 |
| Hot $H_2SO_4$ ---v-- | 400 | 550 | 900 | ------- |

Figure 3:
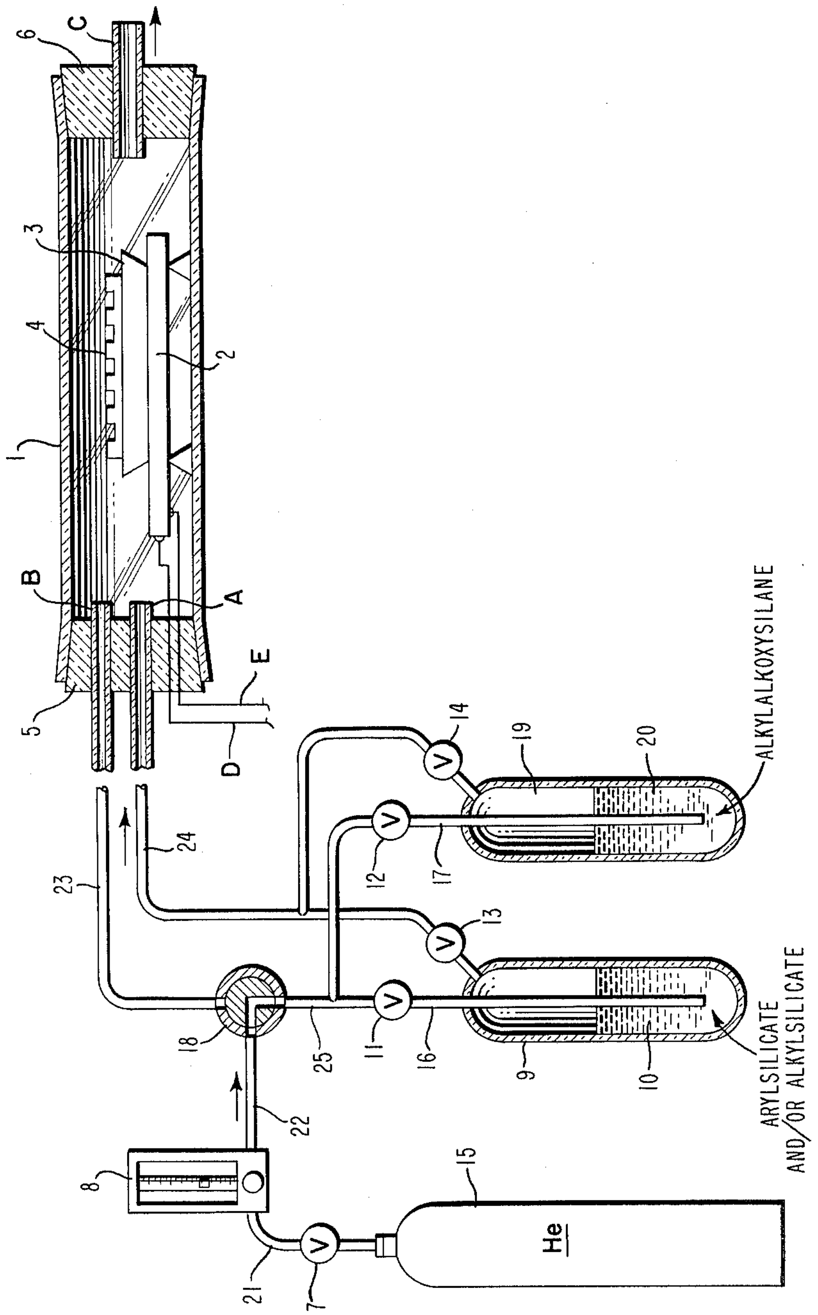
FIGURE 3 shows schematically suitable apparatus for the pyrolytic deposition of protective coatings.

Suitable apparatus for the pyrolytic deposition of the protective coating on the semiconductor device is illustrated in FIGURE 3. The reactor consists of quartz reactor tube 1 having inlet tubes A and B and outlet tube C. Stoppers 5 and 6 seal reactor tube to the inlet tubes A and B and outlet tube C, respectively. Also, in the reactor is strip heater 2, which may be carbon, having power leads D and E sealed within stopper 5. A boat 3 of molybdenum or other suitable material is placed on heater 2. The cleaned semiconductor slice 4 is placed in boat 3. The gas system indicated at the left of the drawing permits pure helium or arylsilicate and/or alkylsilicate vapor in helium, or alkylalkoxysilane vapor in helium to be passed through the reactor tube. It should be understood that any inert gas may be used instead of helium. This is achieved by a pure helium source 15 controlled through valve 7 in line 21 to flow meter 8. A three-way valve 18 in line 22 from flow meter 8 may be operated to direct the helium flow into manifold 25 or through line 23 to the reaction chamber 1 via inlet B. Manifold 25 furnishes helium into containers 9 or 19 as desired by opening valve 11 in line 16 or valve 12 in line 17. Valves 13 and 14 in the outlets of containers 9 and 19, respectively, are opened only to allow vapor liquid 10 or 20 to be carried by the helium through the reactor 1 via manifold 24 and inlet A. In other words, valves 11 and 13 are open while valves 12 and 14 are closed and vice versa. As illustrated, liquid 10 is an arylsilicate or alkylsilicate or mixtures thereof whereas liquid 20 is an alkylalkoxysilane.

As illustrated in FIGURE 3, after the foregoing six cleaning steps have been performed, the slice 4 is placed in molybdenum boat 3 on top of carbon strip heater 2 in quartz tube reactor 1. The reactor is then flushed with helium from container 15 by adjusting the gas system as described hereinabove. The silicon slice 4 is subsequently brought up to a temperature of about 800° C., by applying power over leads D and E to the strip heater 2. After the slice has reached this temperature, helium is flowed into container 9 having therein liquid 10 which is an alkylsilicate such as tetraethylorthosilicate (also called tetraethoxysilane—TEOS). The TEOS is added to the helium by bubbling the gas through liquid TEOS at room temperature and thereafter by opening valve 13 the composite gas mixture (He and TEOS) is permitted to flow through line 24 into the reactor and over the slice 4, the flow rate of the composite gas mixture being from about 180 to 185 feet per hour interface flow to provide 0.03% by volume of TEOS in the helium gas in the presence of the silicon slice.

As close as can be measured, the amount of material deposited onto the surface of the slice is about 2 milligrams of silicon oxide coating. The coating thickness deposited by this process is about 24,000 angstrom units, and the growth rate of the coating is about 800 angstroms per minute. That is, a coating thickness of 24,000 angstroms in provided after the gas mixture has flowed for about 30 minutes at 800° C.

Figure 4:
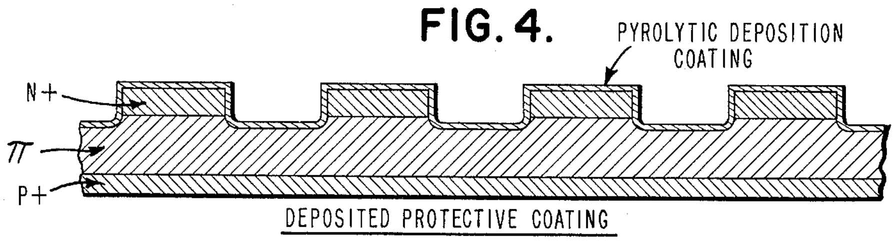
FIGURE 4 shows a deposited protective coating on the etched mesa structure.

The TEOS source is then shut off by changing the flow path of helium from container 15 through three-way valve 18 so that the helium flows via line 23 and inlet B into the reactor 1. An alkylalkoxysilane such as ethyltriethoxysilane (ETES) vapor is then introduced into the system by adjusting the gas system as hereinabove described to supply helium through manifold 25 to container 19 only, which contains liquid 20, being in this case ETES. Thus, the alkylalkoxysilane, ETES, is flowed through reactor 1 via valve 14, manifold 24 and inlet A. The slice 4 remains at a temperature of about 800° C., the percent by volume of ETES in the helium being about the same as that of TEOS in the helium. The same flow rate and conditions existed for ETES as for TEOS. The ETES mixture is then passed over the silicon slice for a period of approximately 5 minutes and is then shut off by changing the flow path of helium from container 15 through three-way valve 18. The helium continues to flow through the reaction chamber by way of inlet B. Power to the strip heater 2 is then shut off and the slice 4 is cooled to room temperature by radiation in the presence of the helium gas. Measurements have shown that the second coating deposited on the slice is about 2,000 angstroms in thickness, the growth rate of the second coating being about 400 angstroms per minute. FIGURE 4 illustrates the pyrolytically deposited coating.

Figure 5:
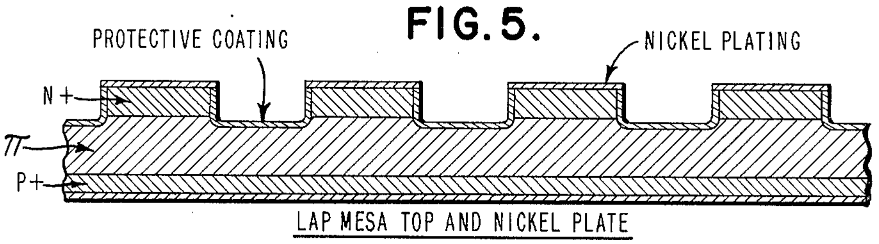
FIGURE 5 shows a lapped mesa top with a nickel plate on the mesa.
Figure 6:
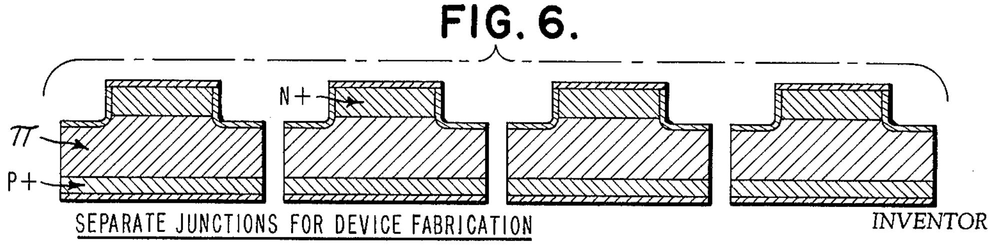
FIGURE 6 shows the slice after it has been cavitroned.

After the second coating has been formed and the slice 4 has been cooled in the reactor, the slice is removed. The top and bottom surfaces of the slice are lapped or etched to remove the coatings from the top of the mesas and the bottom of the slice. (Alternatively, a masking process can be used to selectively etch away the coating, although it is not desirable to contaminate the slice with the fluorine contained in etching hydrofluoric acid.) The slice is then electroless nickel-plated in the areas where the coatings have been removed, that being the top of the mesas and the bottom of the slice (FIGURE 5). The nickel-plate is then sintered into the slice at about 600° C., the slice is cavitroned (FIGURE 6) and then packaged.

It should be understood that although both the TEOS and ETES coatings will be referred to as a form of silicon dioxide coating, it is not certain whether these coatings are pure silicon dioxide or contain impurities. It is known, however, that the two coatings have different properties. The TEOS coating (the first coating) is a form of silicon dioxide and has good electrical properties. That is, it provides a low dissipation factor and a high resistivity film. However, it is mechanically delicate. It does not compare to a hard thermally grown silicon dioxide coating.

The ETES coating (the second coating) is not electrically as good as the TEOS or thermally grown oxide coatings. However, it is mechanically hard and strong and is extremely moisture impervious. It is thought that the ETES coating fills up the holes in the TEOS surface and acts as a glaze. The ETES coating is strong and is comparable to the strength of a thermally grown silicon dioxide coating.

The temperatures, periods of time and flow rates given in the foregoing discussion for depositing the described coatings on a PN silicon semiconductor have been optimized by experimentation. However, variations of these times, temperatures and flow rates are within the scope of the invention.

There are many advantages of a composite film over the standard thermally grown silicon dioxide film. For example, the total time to produce the composite film is about 35 minutes at 800° C., 30 minutes being for the TEOS film and 5 minutes for the ETES film. In comparison, the total time to produce a thermally grown silicon dioxide film of equal thickness is about 7 hours or more, at 1200° C. The time factor alone provides a great advantage in the coating of semiconductor devices on a production basis.

Some of the electrical parameters of the coatings have been measured and are as follows:

For the TEOS coating the dielectric constant has been found to be about 4.0. In comparison, the thermally grown silicon dioxide layer has a dielectric constant averaging from about 3.8 to about 4.2. The breakdown voltage of the TEOS coating is about 0.05 volt per angstrom unit in comparison to the breakdown voltage of about 0.1 volt per angstrom unit for a thermally grown silicon dioxide layer. The dielectric loss for a thermally grown silicon dioxide layer and a pyrolytically deposited composite layer is about the same.

Although the invention has been described with respect to the compounds tetraethylorthosilicate (TEOS) and ethyltriethoxysilane (ETES), it should be understood that this invention is not limited to these compounds. Tetraethylorthosilicate falls in the class of compounds known as alkylsilicates. Any of the alkylsilicates will suffice under the appropriate conditions pointed out below. In fact any alkylsilicate or arylsilicate or mixtures thereof may be used as the first coating on the silicon wafer. Structurally these would be $(RO)_4Si$ where R represents an alkyl group or an aromatic group or a mixture of alkyl and aromatic groups. Also, R could represent R′, R″, R‴ and R⁗ which, in turn, could be any combination of alkyl or aromatic radical or mixture thereof. Typical alkylsilicates which may be used in the present invention are tetraethylorthosilicate (TEOS), tetramethylorthosilicate, tetrapropylorthosilicate, tetraisopropylorthosilicate, tetraisobutylorthosilicate, etc. The arylsilicates which may be used in the present invention would include, typically, tetraphenylorthosilicate, tetratotylorthosilicate, tetranaphthylorthosilicate, tetraxylylorthosilicate, etc. In these compounds, the carbon is bonded to the oxygen and the hydrogen is bonded to the carbon, there being no bond existing between the hydrogen and the oxygen. The temperature necessary to pyrolytically deposit silicon dioxide from an alkylsilicate, arylsilicate, or mixtures thereof, is high enough to break the carbon-oxygen bond but not high enough to break the carbon-carbon bond. If the carbon-carbon bond is broken, elemental carbon is deposited, thus causing the silicon dioxide coating to be conductive. The temperature range for breaking only the carbon-oxygen bond is from about 600° C. to 1000° C. for alkylsilicates. (The longer the carbon chain in these silicate compounds, the more readily the carbon-carbon bond breaks at lower temperatures.)

The applicable classes of compounds that will suffice in the present invention for the second coating are alkyltrialkoxysilanes and dialkyldialkoxysilanes, both these classes being part of a broader class, that being alkylalkoxysilanes. Specifically, ETES belongs to the alkyltrialkoxysilanes. The formula for alkyltrialkoxysilanes is $R'Si(OR'')_3$, where R′ and R″ are carbon-hydrogen combinations. R′ and R″ can be the same or different. Specifically, ETES is $(C_2H_5)Si(OC_2H_5)_3$. Other alkylalkoxysilanes are typically amyltriethoxysilane, vinyltriethoxysilane, dimethyldimethoxysilane, etc.

The same holds true for the temperature applicable for breaking the carbon-oxygen bond but not the carbon-carbon bond. The applicable temperature range for both alkyltrialkoxysilanes and dialkyldialkoxysilanes is from about 600° C. to about 850° C.

Although the invention has been described with respect to the production of protective coatings in a silicon semiconductor by way of example, it is to be understood that various changes and modifications in the apparatus for the practice thereof may be resorted to and other semiconductors may be similarly coated (highly doped germanium slice, for instance) without departing from the spirit and scope of the invention as defined by the appended claims.

What is claimed is:

1. A method of coating a semiconductor slice comprising the steps of heating a slice in the presence of an inert gas to a temperature sufficient to pyrolytically decompose arylsilicates, alkylsilicates and alkylalkoxysilanes at the carbon-oxygen bond in an otherwise inert ambient, subjecting said slice at said temperature to a first vapor containing a compound selected from the group consisting of alkylsilicates, arylsilicates and mixtures thereof, and then subjecting said slice at said temperature to a second vapor containing an alkylalkoxysilane.

2. The method as set forth in claim 1, wherein said first vapor is triethylorthosilicate.

3. The method as set forth in claim 1 wherein said second vapor is ethyltriethoxysilane.

4. A method of coating a semiconductor slice comprising the steps of subjecting said slice in a reaction chamber to an alkylsilicate vapor, then subjecting said slice in said reaction chamber to a alkylalkoxysilane vapor, and maintaining the temperature within said reaction chamber sufficient to decompose the alkylsilicate and alkylalkoxysilane at respective carbon-oxygen valence bonds thereof in an otherwise inert ambient.

5. The method of claim 4 wherein said alkylsilicate is tetraethylorthosilicate.

6. The method of claim 4 wherein said alkylalkoxysilane is ethyltriethoxysilane.

7. The method of claim 4 wherein said alkylsilicate is tetraethylorthosilicate and said alkylalkoxysilane is ethyltriethoxysilane.

8. A method of coating a semiconductor slice comprising the steps of subjecting said slice in a reaction chamber to arylsilicate vapor, then subjecting said slice in said reaction chamber to an alkylalkoxysilane vapor, and maintaining the temperature within said reaction chamber sufficient to decompose the alkylsilicate and alkylalkoxysilane at respective carbon-oxygen valence bonds thereof in an otherwise inert ambient.

9. The method of claim 8 wherein said arylsilicates is tetraphenylorthosilicate.

10. The method of claim 8 wherein said arylsilicate is tetrazylylorthosilicate.

11. A method of coating a semiconductor slice comprising the steps of subjecting said slice in a reaction chamber to a mixed vapor comprising alklysilicate and arylsilicate, then subjecting said slice in said reaction chamber to an alkylalkoxysilane, and maintaining said reaction chamber during the subjection of said slice to said mixed vapor and said alkylalkoxysilane vapor at a temperature sufficient to decompose the alkylsilicate and arylsilicate within said mixed vapor at respective carbon-oxygen valence bonds thereof in an otherwise inert ambient.

12. The method of claim 11 wherein said alkylalkoxysilane is ethyltriethoxysilane.

13. A method of coating a semiconductor slice comprising the steps of subjecting said slice to a temperature of from about 600° C. to about 1000° C. in a reaction chamber, subjecting said slice within said temperature range in said reaction chamber to a first vapor selected from the group consisting of arylsilicates, alkylsilicates and mixtures thereof, and then subjecting said slice within said temperature range in said reaction chamber to a second vapor containing alkylalkoxysilane.

14. A method of coating a semiconductor slice comprising the steps of subjecting said slice to a temperature of from about 600° C. to about 1000° C. in a reaction chamber, subjecting said slice within said temperature range in said reaction chamber to a first vapor selected from the group consisting of alkylsilicate vapor, and then subjecting said slice within said temperature range in said reaction chamber to a second vapor selected from the group containing alkyltrialkoxysilane and dialkyldialkoxysilane.

15. A method as set forth in claim 4 wherein said alkylsilicate vapor is tetraethylorthosilicate.

16. A method as set forth in claim 4 wherein said vapor selected from said group is ethyltriethoxysilane.

17. A method of coating a semiconductor slice comprising the steps of subjecting said slice to a temperature of from about 600° C. to about 850° C. in a reaction chamber, subjecting said slice within said temperature range in said reaction chamber to tetraethylorthosilicate vapor, and then subjecting said slice within said temperature range in said reaction chamber to ethyltriethoxysilane vapor.

18. A method of coating a semiconductor slice comprising the steps of subjecting said slice to a temperature of from about 600° C. to about 850° C. in a reaction chamber, subjecting said slice within said temperature range in said reaction chamber to an inert gas, subjecting said slice within said temperature range in said reaction chamber to an alkylsilicate vapor in an inert gas carrier, and then subjecting said slice within said temperature range in said reaction chamber to a vapor selected from the group consisting of alkyltrialkoxysilanes and dialkyldialkoxysilanes in an inert gas carrier.

19. A method as set forth in claim 18 wherein said alkylsilicate vapor is tetraethylorthosilicate and said vapor selected from said group is ethyltriethoxysilane.

20. A method as set forth in claim 18 wherein said inert gas is helium.

21. A method as set forth in claim 19 wherein said inert gas is helium.

References Cited by the Examiner

UNITED STATES PATENTS

| | | | |
|---|---|---|---|
| 2,874,076 | 2/1959 | Schwartz | 117—200 |
| 2,894,860 | 7/1959 | Engelhardt | 134—1 |
| 2,913,358 | 11/1959 | Harrington et al. | 117—200 |
| 2,961,354 | 11/1960 | Cleveland | 134—1 |
| 3,086,892 | 5/1963 | Huntington | 117—200 |
| 3,114,663 | 12/1963 | Klerer | 117—201 |

JOSEPH B. SPENCER, *Primary Examiner.*

RICHARD D. NEVIUS, *Examiner.*